(12) United States Patent
Donohoe

(10) Patent No.: US 11,787,365 B2
(45) Date of Patent: Oct. 17, 2023

(54) AUTOMOBILE SECURITY APPARATUS

(71) Applicant: SAC LABS Limited, London (GB)

(72) Inventor: Vincent Donohoe, London (GB)

( * ) Notice: Subject to any disclaimer, the term of this patent is extended or adjusted under 35 U.S.C. 154(b) by 0 days.

(21) Appl. No.: 17/411,138

(22) Filed: Aug. 25, 2021

(65) Prior Publication Data

US 2022/0063560 A1 Mar. 3, 2022

Related U.S. Application Data

(60) Provisional application No. 63/071,165, filed on Aug. 27, 2020.

(51) Int. Cl.
*H04W 4/80* (2018.01)
*B60R 25/24* (2013.01)
*B60R 25/20* (2013.01)

(52) U.S. Cl.
CPC .......... *B60R 25/2036* (2013.01); *H04W 4/80* (2018.02); *B60R 2325/101* (2013.01); *B60R 2325/105* (2013.01)

(58) Field of Classification Search
CPC ................................................. B60R 25/2036
See application file for complete search history.

(56) References Cited

U.S. PATENT DOCUMENTS

| | | | |
|---|---|---|---|
| 2006/0224194 A1* | 10/2006 | Casavant | A61N 1/39622 607/5 |
| 2013/0029596 A1* | 1/2013 | Preston | H04W 52/0241 455/41.1 |
| 2016/0055699 A1* | 2/2016 | Vincenti | G07C 9/00857 340/5.61 |
| 2016/0164976 A1* | 6/2016 | Hassan | H04L 65/1083 709/204 |
| 2016/0300417 A1* | 10/2016 | Hatton | G07C 9/00857 |
| 2021/0176810 A1* | 6/2021 | Chae | H04W 4/80 |

* cited by examiner

*Primary Examiner* — Joseph H Feild
*Assistant Examiner* — Pameshanand Mahase
(74) *Attorney, Agent, or Firm* — Lambert Shortell & Connaughton; David J. Connaughton, Jr.; Justin P. Tinger

(57) ABSTRACT

The object of the present invention is to provide a convenient means for accessing a car or other automobile, and operation of the engine and other controlled functions, while making it more difficult for criminals to gain access to the car. A car security system comprises a key fob, a car transceiver system, and a security card RFID. The key fob comprises a fob PCB having a fob antenna, and a converter tab which has tab circuitry and an antenna.

6 Claims, 5 Drawing Sheets

AUTOMOBILE SECURITY APPARATUS

FIELD OF THE INVENTION

The present specification relates to automobile security apparatus, particularly but not exclusively for the locking and unlocking of access to cars, and the locking and unlocking of the car's engine ignition.

BACKGROUND OF THE INVENTION

Many cars are now operated by fobs, which transmit a radio signal to the car to lock and unlock the car doors and boot. Some cars also employ a keyless ignition system, again operated by the fob.

SUMMARY

The object of the present invention is to provide a convenient means for accessing a car or other automobile, and operation of the engine and other controlled functions, while making it more difficult for criminals to gain access to the car. A car security system comprises a key fob, a car transceiver system, and a security card RFID. The key fob comprises a fob PCB having a fob antenna, and a converter tab which has tab circuitry and an antenna.

DETAIL DESCRIPTIONS OF THE INVENTION

All illustrations of the drawings are for the purpose of describing selected versions of the present invention and are not intended to limit the scope of the present invention. Some key fobs operate by being in the vicinity of the car. The key fob 10 periodically sends a polling signal, and if the key fob is close to the car, the car detects this and sends a reply, expecting a coded signal that the key fob 10 should generate. If the key fob responds with the correct coded signal, the car will unlock and possibly start.

Figure 1:
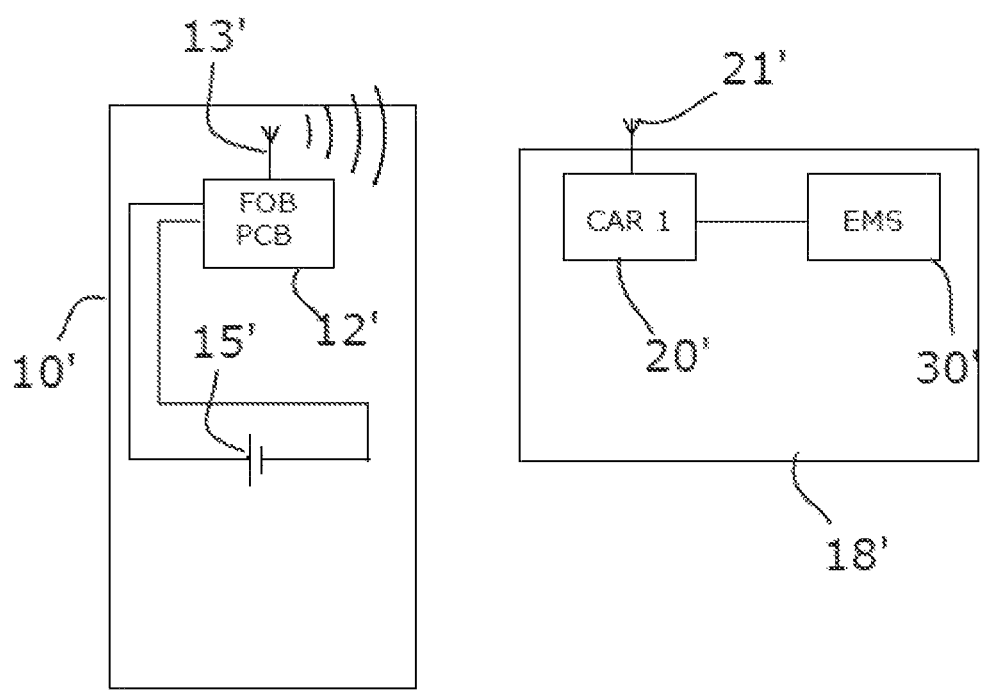
FIG. 1 is a diagrammatic view of the prior art.

Referring for FIG. 1, a conventional car key fob system comprises a key fob 10' having a fob PCB 12' and fob antenna 13' powered by a cell 15', while the car transceiver system 18' has a transceiver 20' having an antenna 21', the transceiver 20' being connected to the car's EMS (Engine Management System) 30'. When the car transceiver system 18 has verified the identity of the key fob 10 the EMS 30 disengages the car's locks and can even start the engine.

One method criminals employ is to position a first transceiver near the key fob 10', for example close to the car-owner's front door, and a second transceiver close to the car, the two transceivers being in communication. When the car-owner's key fob sends a polling signal, the first transceiver relays this to the second transceiver and thence to the transceiver 20', and then the first and second transceivers relay the response car transceiver system 18' and the coded signal from the key fob 10' between the car transceiver system 18' and the key fob 10'. The car thinks that the key fob is near the car and opens.

The object of the present invention is to provide a convenient means for accessing a car or other automobile, and operation of the engine and other controlled functions, while making it more difficult for criminals to gain access to the car.

According to the present invention, there is provided an automobile security apparatus according to claim 1.

Figure 2:
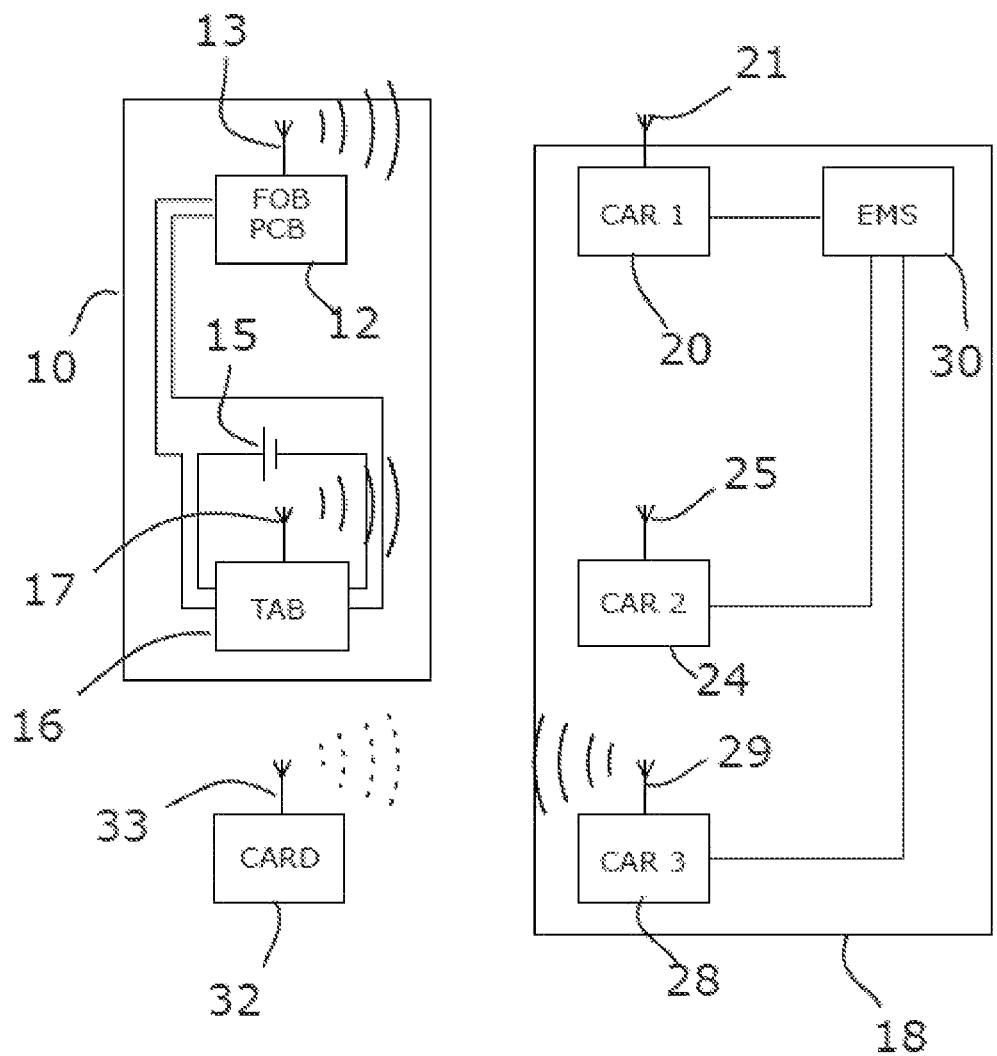
FIG. 2 is a diagrammatic view of the system.

Referring to FIG. 2, a car security system comprises a key fob 10, a car transceiver system 18, and a security card RFID 32.

The key fob 10 comprises a fob PCB 12 having a fob antenna 13, and a converter tab 40 which has tab circuitry 16 and an antenna 17.

The car transceiver system 18 comprises a primary transceiver 20 and primary antenna 21, a secondary transceiver 24 and secondary antenna 25, and a tertiary transceiver 28 and tab antenna 17. The primary transceiver 20, secondary transceiver 24, and tertiary transceiver 28 and all connected to the EMS 30.

Also, included in the system is a security card RFID 32, having a RFID antenna 33.

The key fob 10 is of a conventional design; having circuitry, for example a fob PCB 12 powered by a cell 15, The key fob 10 automatically transmits a radio wave signal using the fob antenna 13 which is received by the car transceiver system 18 and which causes the car to carry out the requested function, such as to unlock the car, and/or start the engine.

Figure 3:
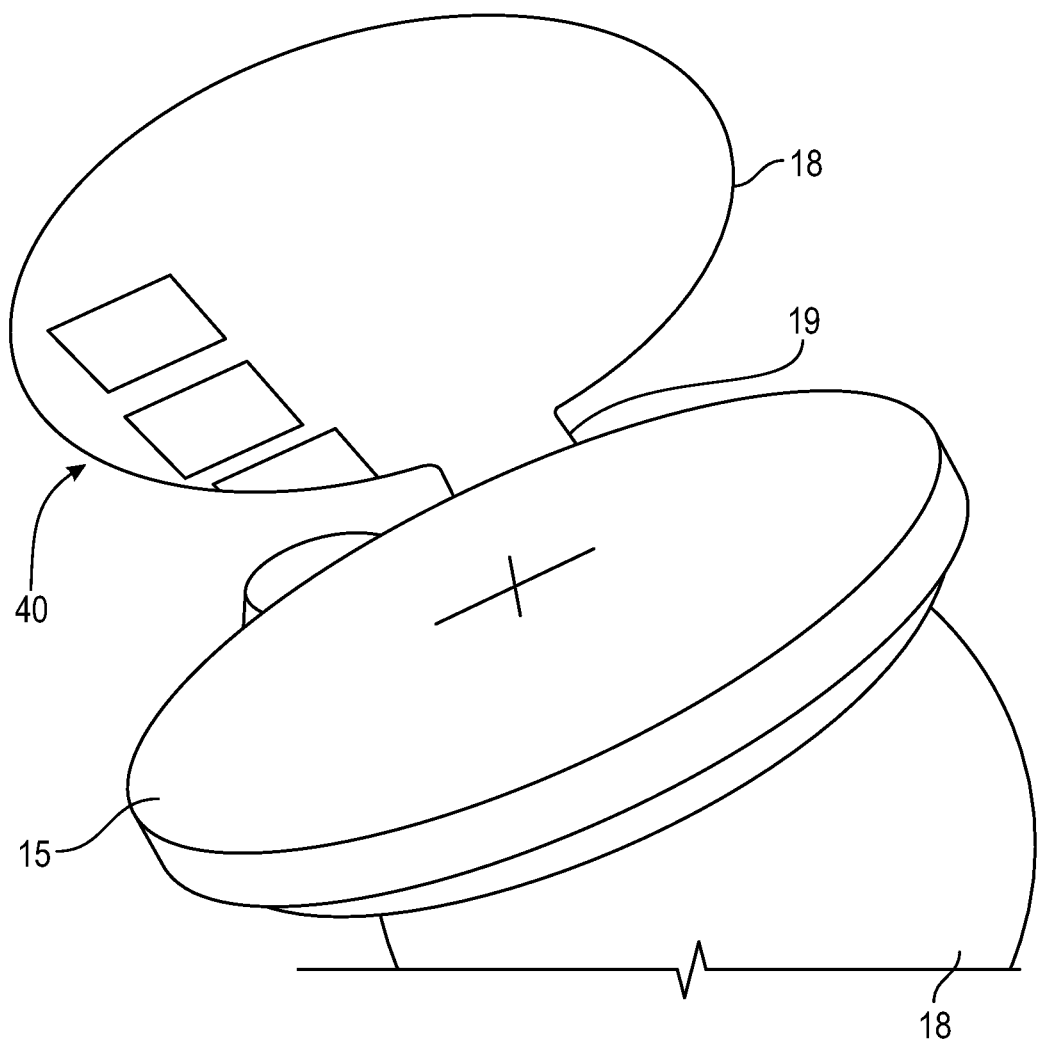
FIG. 3 is a perspective view of the converter and battery during a first stage of installation.
Figure 4:
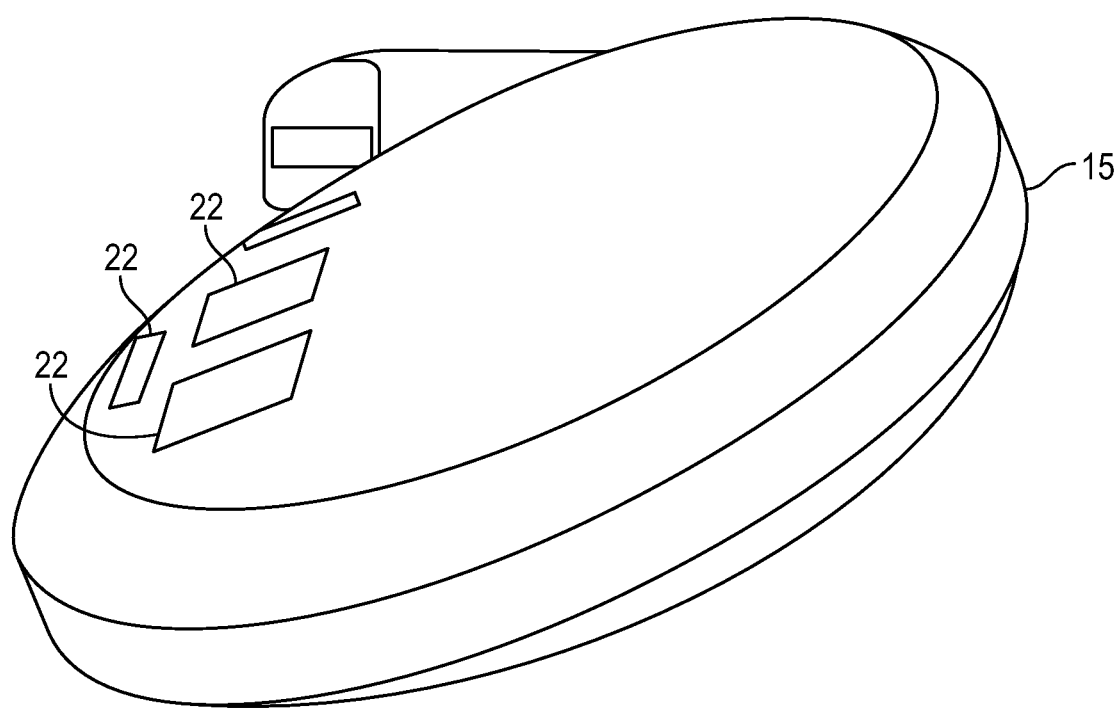
FIG. 4 is a perspective view of the converter and battery during a second stage of installation.
Figure 5:
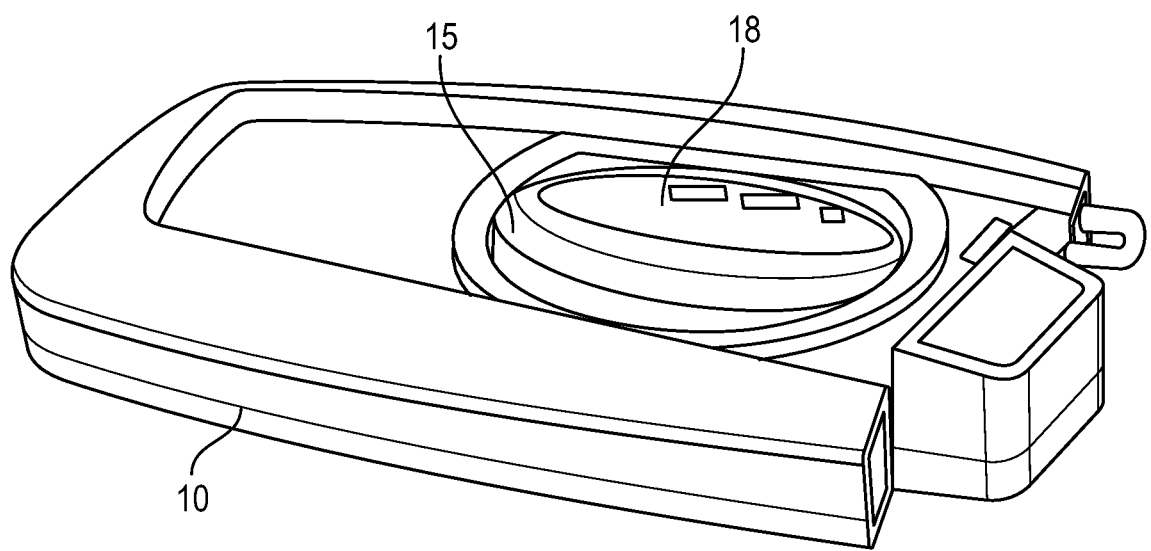
FIG. 5 is a perspective view of the converter, battery and part of the fob during a third stage of installation.

Conventionally, the key fob 10 is powered by a button-type cell. Referring also to FIGS. 2 to 4 of the security systems, a converter tab 40 comprising two circular pads 18 joined by a hinge 19 is incorporated into the key fob 10. The cover of the fob 10 is removed to expose the cell 15, and the two pads 18 are placed on either side of the cell 15. The cell 15 and the tab 40 are then placed in the battery compartment of the fob 10 and the fob cover is replaced. The tab 40 includes tab circuitry 16 and a tab antenna 17. The tab 40 and tab antenna 17 uses the Bluetooth standard to transmit and receive signals.

The primary transceiver 20 of the car transceiver system 18 receives radio wave signals from the fob antenna 13 via the primary antenna 21. The secondary transceiver 24 uses the Bluetooth standard to transmit and receive signals. Thus, it can communicate with the tab 40 and tab antenna 17.

The Bluetooth system has a number of security protection features available, and the signal it sends is encrypted. The range of the secondary transceiver 24 is set to be around 30 cm.

The tab 40 includes contacts 22, which connect electrically the contacts of the fob 10 which would conventionally connect with the cell 15. When the user operates the fob 10 in the usual manner, the operation is detected by the tab 40 contacts and prompts the tab 40 to transmit a Bluetooth signal. The tab 40 may utilize electric power from the cell 15. As the tab 40 isolates the cell 15 from the fob, it disables the usual operation of the fob.

Referring to figure back to FIG. 1, the EMS 30 requires that a verified Bluetooth signal from the tab 40 is received by the secondary transceiver 24 and secondary antenna 25, before any signal from the primary transceiver 20 and primary antenna 21 is acted upon. When the user wishes to open or start the car, they operate the key fob 10 to do this in the conventional manner, however ensuring that they are within 30 cm of the car. The tab 40 sends a Bluetooth signal to the secondary antenna 25 of the car transceiver system 18, and the car transceiver system 18 verifies the identity of the tab 40. The EMS 30 is then made receptive to signals from the key fob 10 transmitted by the fob PCB 12 and fob antenna 13. The car may then be operated in the conventional manner with the fob PCB 12 and fob antenna 13 requested a car operation, such as locking and unlocking of the doors, or the ignition of the engine, and the EMS 30 acts on this signal supplied by the primary transceiver 20.

When the tab 40 and secondary antenna 25 are removed from the 30 cm range of the vehicle, the EMS 30 detects this and the primary transceiver 20 and primary antenna 21 are disengaged.

Referring to FIG. 1, the user may also be supplied with a security card having a security card RFID 32. The security card could for example be the dimensions of a credit card, so could conveniently be kept in the user's wallet. The security card RFID 32 has an RFID antenna 33. The car transceiver system 18 is provided with a tertiary transceiver 28 and tab antenna 17 which can detect and interrogate passive RFID circuits.

As an alternative to using the key fob 10 with the tab 40, the user may instead use the security card by placing the security card RFID 32 in proximity to the tertiary antenna 29. Upon detecting and verifying that the security card RFID 32 is valid, the tertiary transceiver 28 communicates this to the EMS 30 and allows the car to be locked, unlocked and the engine to be started, allowing the user to operate the car.

This can be useful if the user mislays their key fob, if it is stolen, or if the cell 15 fails. RFID systems usually operate over a very short distance in the order of centimeters, so the security card RFID 32 must be brought into close proximity of the tertiary antenna 29 for the car to be operated; the user may choose to position the tertiary antenna 29 in one of a number of locations on the car to increase security, for example having the tertiary antenna 29 discretely secured to part of the inside window of the car.

The logic of the car transceiver system 18 is thus that signals from both the primary transceiver 20 and the secondary transceiver 24 are required to operate the car, or independently a signal from the tertiary transceiver 28. The system is envisaged to be retrofitted into existing prior art car transceiver systems, such as shown in FIG. 1. A convenient way of including the secondary transceiver 24 and tertiary transceiver 28 is to include these at or near the connections from the car's fuse box system to the EMS 30; the secondary transceiver 24 and tertiary transceiver 28 effectively introduce a switch in series with one or more fuses, so that certain power systems are disabled unless the secondary transceiver 24 and/or tertiary transceiver 28 receive compliant authorized signals from the tab 40 or security card, whereupon the fuse circuits are reconnected and the EMS can receive and act on the conventional signals from the fob PCB 12.

It should be noted that the system can be implemented just with the key fob 10 and tab 40, and the addition to the car transceiver system 18 of a secondary transceiver 24 and secondary antenna 25, without implementing the security card and tertiary transceiver 28 and tab antenna 17.

Although the invention has been explained in relation to its preferred embodiment, it is to be understood that many other possible modifications and variations can be made without departing from the spirit and scope of the invention.

What is claimed is:

1. An automobile security system comprising:
    a. a car transceiver system comprising:
        i. a primary car transceiver that uses RF signals,
        ii. a secondary car transceiver that uses signals having a Bluetooth standard,
    b. the primary transceiver and secondary transceiver being connected to an Engine Management System;
        i. a key device comprising:
            an integral first mobile transceiver that uses RF signals for communicating with the primary car transceiver;
            a second mobile transceiver that uses signals having a Bluetooth standard transceiver for communicating with the secondary transceiver;
            the Engine Management System requiring a validated signal to be received from the secondary transceiver before effecting controlled operation, the controlled operation including at least one of locking a plurality of doors, unlocking the plurality of doors, and starting an engine;
            wherein the second mobile transceiver is located between a power source of the key device and a pre-existing control circuit of the key device, so that the pre-existing control circuit of the key device is disabled from sending RF signals.

2. An automobile security system according to claim 1, wherein a third transceiver is included in the car transceiver system, which is capable of interrogating an RFID chip, and if the RFID chip is valid, instructing the Engine Management System to effect a controlled operation, the controlled operation including at least one of locking the plurality of doors, unlocking the plurality of doors, and starting the engine, bypassing the requirement for a validated signal to be received from the secondary transceiver.

3. An automobile security system according to claim 1, further comprising a Bluetooth microchip carried on a converter, wherein the Bluetooth microchip is insertable between the power source_of the key device and a plurality of electronic contacts of the key device.

4. A mobile transceiver according to claim 1.

5. A car receiver system according to claim 1.

6. A converter according to claim 3.

* * * * *